United States Patent [19]

Malik

[11] Patent Number: 5,373,434
[45] Date of Patent: Dec. 13, 1994

[54] PULSE WIDTH MODULATED POWER SUPPLY

[75] Inventor: Randhir S. Malik, South Burlington, Vt.

[73] Assignee: International Business Machines Corporation, Armonk, N.Y.

[21] Appl. No.: 216,205

[22] Filed: Mar. 21, 1994

[51] Int. Cl.$^5$ ................... H02H 7/122; H02M 3/335
[52] U.S. Cl. ........................ 363/56; 363/21; 361/18
[58] Field of Search ...................... 363/16, 20, 21, 50, 363/51, 55, 56, 74, 76, 80, 89, 97, 131; 361/18, 86, 89, 91; 323/282, 284

[56] References Cited

U.S. PATENT DOCUMENTS

| | | | |
|---|---|---|---|
| 4,172,276 | 10/1979 | Kameya | 363/19 |
| 4,202,023 | 5/1980 | Sears | 361/18 |
| 4,573,099 | 2/1986 | Ganesan et al. | 361/56 |
| 4,626,954 | 12/1986 | Damiano et al. | 361/96 |
| 4,731,655 | 3/1988 | Lee et al. | 363/50 |
| 4,795,920 | 1/1989 | Hechtman et al. | 307/271 |
| 4,816,982 | 3/1989 | Severinsky | 363/44 |
| 4,994,886 | 2/1991 | Nadd | 357/41 |
| 5,017,016 | 5/1991 | Wilcox | 307/570 |
| 5,018,041 | 5/1991 | Szepesi | 361/18 |
| 5,023,692 | 6/1991 | Wodarczyk | 357/43 |
| 5,027,251 | 6/1991 | Hirota et al. | 361/18 |
| 5,029,269 | 7/1991 | Elliott et al. | 363/21 |
| 5,034,871 | 6/1991 | Okamoto et al. | 363/21 |
| 5,088,018 | 2/1992 | Lee | 363/56 |
| 5,105,251 | 4/1992 | Nakayama | 357/41 |
| 5,282,107 | 1/1994 | Balakrishnan | 361/18 |
| 5,285,366 | 2/1994 | Zaretsky | 363/56 |
| 5,291,387 | 3/1994 | Ohshima | 363/56 |

Primary Examiner—Steven L. Stephan
Assistant Examiner—Matthew Nguyen
Attorney, Agent, or Firm—Arthur J. Samodovitz

[57] ABSTRACT

A control for a pulse width modulated power supply controls the duty cycle to provide sufficient charging to the output capacitor to satisfy a rated load, yet avoids saturation of the power transformer and overheating of the switch during and after excess line voltage conditions. The control comprises a sense transformer in series with a power transformer, a DC power source and a modulating switch. A rectifier is connected to a secondary winding of the sense transformer. The control also comprises a first capacitor coupled to the rectifier to receive charging current therefrom. The on time of the switch is based on a comparison of a voltage across the first capacitor to a first reference voltage while the power source exhibits rated conditions. During a large voltage transient the first reference voltage rises to an excess level and maintains the excess level after the transient subsides. Thus, the control also comprises a second capacitor coupled to the power source to receive charging current therefrom, and the on time of the switch is based on a comparison of voltage of the second capacitor to a gradually rising second reference voltage after the transient subsides.

13 Claims, 3 Drawing Sheets

PULSE WIDTH MODULATED POWER SUPPLY

BACKGROUND OF THE INVENTION

The invention relates generally to pulse width modulated power supplies, and deals more particularly with a pulse width modulated power supply having circuitry to protect against effects of lightening and other excess line voltage conditions.

A standard pulse width modulated power supply comprises a power train transformer having primary and secondary windings. One end of the primary winding is connected to a DC voltage source line and the other end is connected to a semiconductor switch. The switch is repeatedly turned on and off to develop an AC voltage across the primary winding. A half or full wave rectifier bridge is connected across the secondary winding and charges an output capacitor to supply the output DC voltage.

The following prior art technique is used to regulate the output voltage during start up and during normal operating conditions. A differential amplifier receives at one input a fixed reference voltage and at the other input a fraction of the output voltage. The output of the differential amplifier is called an "error voltage" and is proportional to the difference between the output voltage fraction and the reference voltage. The output of the differential amplifier charges a reference capacitor through a current limiting resistor and diode. The error voltage is slow to change because of a feedback capacitor in the differential amplifier and a large resistor in parallel with the reference capacitor. The error voltage is supplied to one input of a comparator. The other input is supplied by the voltage across a timing capacitor which is charged by rectified current from a secondary of another, sense transformer. When the voltage across the timing capacitor just exceeds the error voltage, the comparator resets a flip flop which shuts off the switch and delivery of current to the output capacitor (until the next cycle of a clock). Also, the flip flop activates a transistor to discharge the timing capacitor. Because the error voltage rises gradually as the reference capacitor charges, the output current is limited during start up. Eventually, the reference capacitor charges to a higher, steady state level such that the switch stays on long enough to cause the power transformer to deliver sufficient charging current to the output capacitor to deliver operating current.

When this type of pulse width modulated power supply is subject to a large positive transient voltage spike on the input power source line, the current into the power transformer rises substantially. The timing capacitor will also charge more quickly than under rated voltage, however, not proportionally to the increase of power into the power transformer. The result is that excess power is delivered to the power transformer and excess current is passed through the switch, and the power transformer and switch may be damaged. Another problem occurs after the transient subsides because then the error voltage will be higher than the steady state level due to the excess current during the transient and the large time constant of the error voltage. Also, the timing capacitor will no longer be charged at the increased rate after the transient subsides. Thus, the duty cycle of the switch will be excessive and this could damage the switch and the power transformer.

There are prior art techniques to provide protection from the effects of lightening and excess line voltage conditions by disabling the power transformer switch during the transient. See U.S. Pat. No. 4,731,655. U.S. Pat. No. 4,063,307 discloses a limiting resistor and a zener diode connected from a positive input terminal to the base of an NPN transistor. The collector of the NPN transistor is connected to the base of the power transformer switching transistor. The emitter of the NPN transistor is grounded and the base is provided with a return resistor. If a transient voltage of the input terminal exceeds the zener diode rating, the NPN transistor 114 will be biased on pulling the base of the switching transistor low which turns off the switching transistor for the duration of the transient. While the foregoing techniques may provide the requisite protection during the transient, they will not solve the post transient problem in the foregoing type of pulse width modulated power supply.

A general object of the present invention is to provide a pulse width modulated power supply which avoids prolonged turn on of the primary winding semiconductor switch during and after lightening and other excess line voltage conditions.

SUMMARY OF THE INVENTION

The invention resides in a control for a pulse width modulated power supply comprising a power transformer having a primary winding, a secondary winding and a DC power source coupled to the primary winding. A semiconductor switch is also coupled to the primary winding to control power through the primary winding. A rectifier is connected across the secondary winding to rectify current induced in the secondary winding, and supplies the rectified current to an output capacitor to develop a DC output voltage.

The control manages the duty cycle of the switch to provide sufficient charging to the output capacitor to satisfy a rated load, yet avoids saturation of the power transformer and overheating of the switch during and after excess line voltage conditions. The control comprises a sense transformer in series with the power transformer and switch, and a rectifier connected to a secondary winding of the sense transformer. The control also comprises a first capacitor coupled to the rectifier to receive charging current therefrom. The on time of the switch is based on a comparison of a voltage across the first capacitor to a first reference voltage while the power source exhibits rated conditions. During a large voltage transient the first reference voltage rises to an excess level and maintains the excess level after the transient subsides. Thus, the control also comprises a second capacitor coupled to the power source to receive charging current therefrom, and the on time of the switch is based on a comparison of voltage of the second capacitor to a gradually rising second reference voltage after the transient subsides.

DETAILED DESCRIPTION OF THE PREFERRED EMBODIMENT

Figure 1:
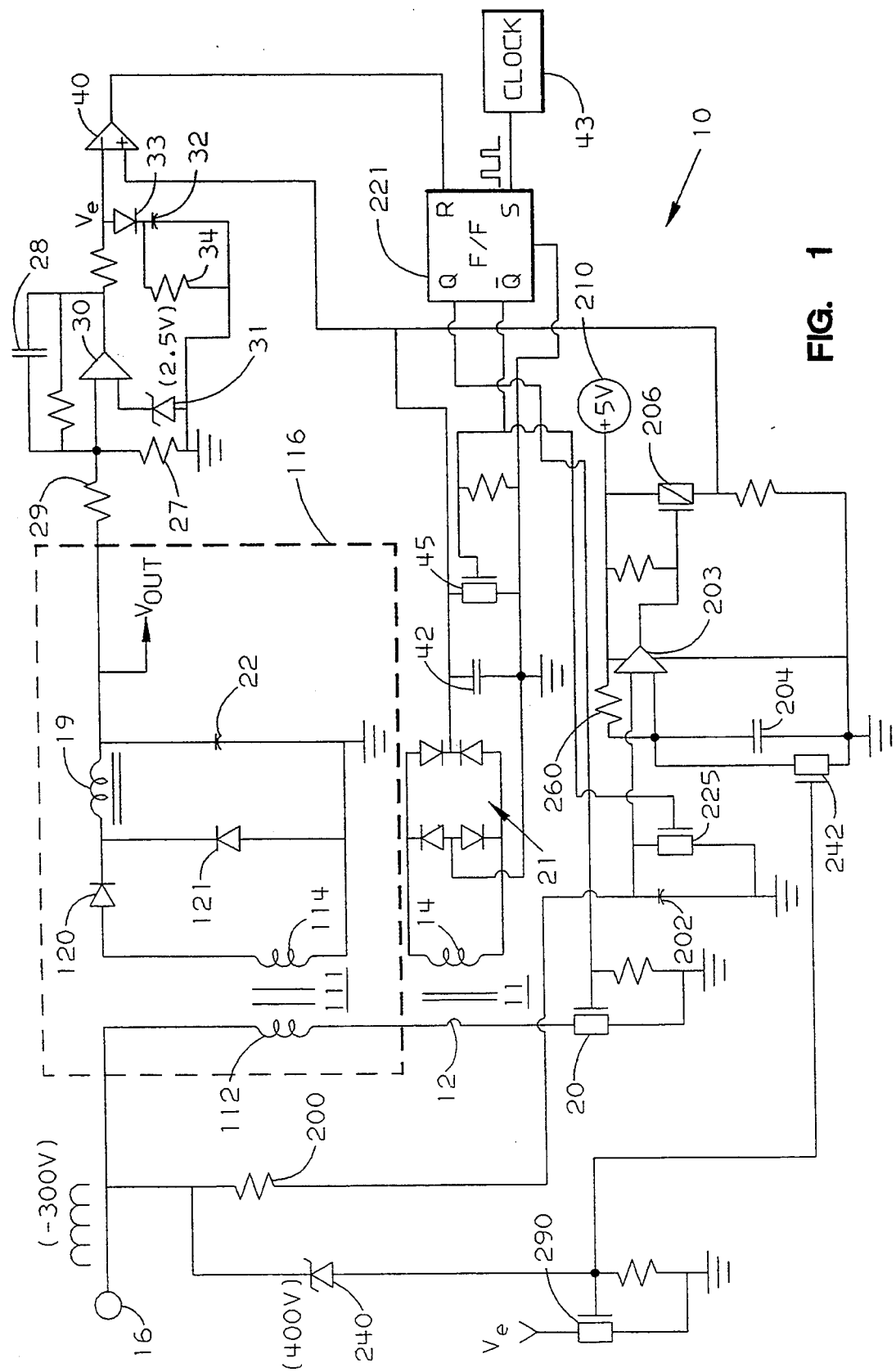
FIG. 1 is a circuit diagram of a pulse width modulated power supply according to the present invention.

FIG. 1 illustrates a pulse width modulated power supply generally designated 10 according to the present invention. Power supply 10 comprises a power transformer 111 and a series, current sense transformer 11. Transformer 11 has a primary winding 12 and a secondary winding 14 and transformer 111 has a primary winding 112 and a secondary winding 114. Transformer 111 is part of a power train 116 and transformer 11 is part of a pulse width modulating control circuit for the power train. A power source 16 is connected to one end of the series primary windings 112 and 12. By way of example, the power source 16 is formed by full wave rectification (not shown) of an AC signal (not shown); the full wave rectified result includes a substantial DC component. For example, the rated DC input voltage is 242 volts with a corresponding peak voltage of 380 volts. A transistor switch 20 is connected to the other end of primary winding 12. An RS flip flop 221 controls switch 20 as described in more detail below to regulate the amount of power delivered to transformers 111 and 11.

Within the power train, rectifiers 120 and 121 and a low pass filter comprising a series inductor 19 and a parallel, output capacitor 22 are connected across the secondary winding 114. A DC output voltage 23 is developed across the output capacitor 22 based on the duty cycle of switch 20 as described below.

Within the control circuitry, a full wave rectifier bridge 21 and a parallel, timing capacitor 42 are connected across the secondary winding 14. Flip flop 221 has a set input which is supplied by a clock 43. When clock 43 outputs a positive pulse, the flip flop turns on switch 20. This causes current to be delivered to transformers 111 and 11, and charging current to be delivered to output capacitor 22 and timing capacitor 42.

The control circuitry uses the DC output voltage 23 for regulation as follows. The DC output voltage is divided by resistors 27 and 29 and supplied to one input of a differential amplifier 30. The other input is supplied by a reference voltage developed across a zener diode 31. Initially, the reference voltage is greater than the divided DC output voltage because the output capacitor 22 cannot charge instantaneously. Consequently, the differential amplifier 30 outputs a positive "error" voltage ("Ve" in FIG. 1) which charges a capacitor 32 through a resistor 34 and a diode 33. The error voltage changes slowly because of a large feedback capacitor 28 for amplifier 30 and a large resistor 34 in parallel with capacitor 32. By way of example, the time constant of amplifier 30 is five milliseconds and the time constant of resistor 34 and capacitor 32 in parallel is 20 milliseconds.

The exponentially rising error voltage is supplied to the inverting input of comparator 40. The noninverting input of comparator 40 is supplied by the error voltage. The output of comparator 40 is connected to the reset input of flip flop 221. Timing capacitor 42 is much smaller than capacitor 32, has a smaller time constant than capacitor 32 and receives charging current from the bridge 21. Capacitor 42 charges much faster than capacitor 32, and the voltage across capacitor 42 quickly exceeds the error voltage. When the voltage across capacitor 42 exceeds the error voltage, the output of comparator 40 goes high and resets flip flop 221 which turns off switch 20. This prevents excessive current flow in and heating of switch 20 during start up.

Nevertheless, output capacitor 22 obtained some charge during this time. An N channel transistor 45 is activated by the Q not output of flip flop 221 when switch 20 is turned off to discharge timing capacitor 42 in preparation for the next charging cycle.

Figure 2:
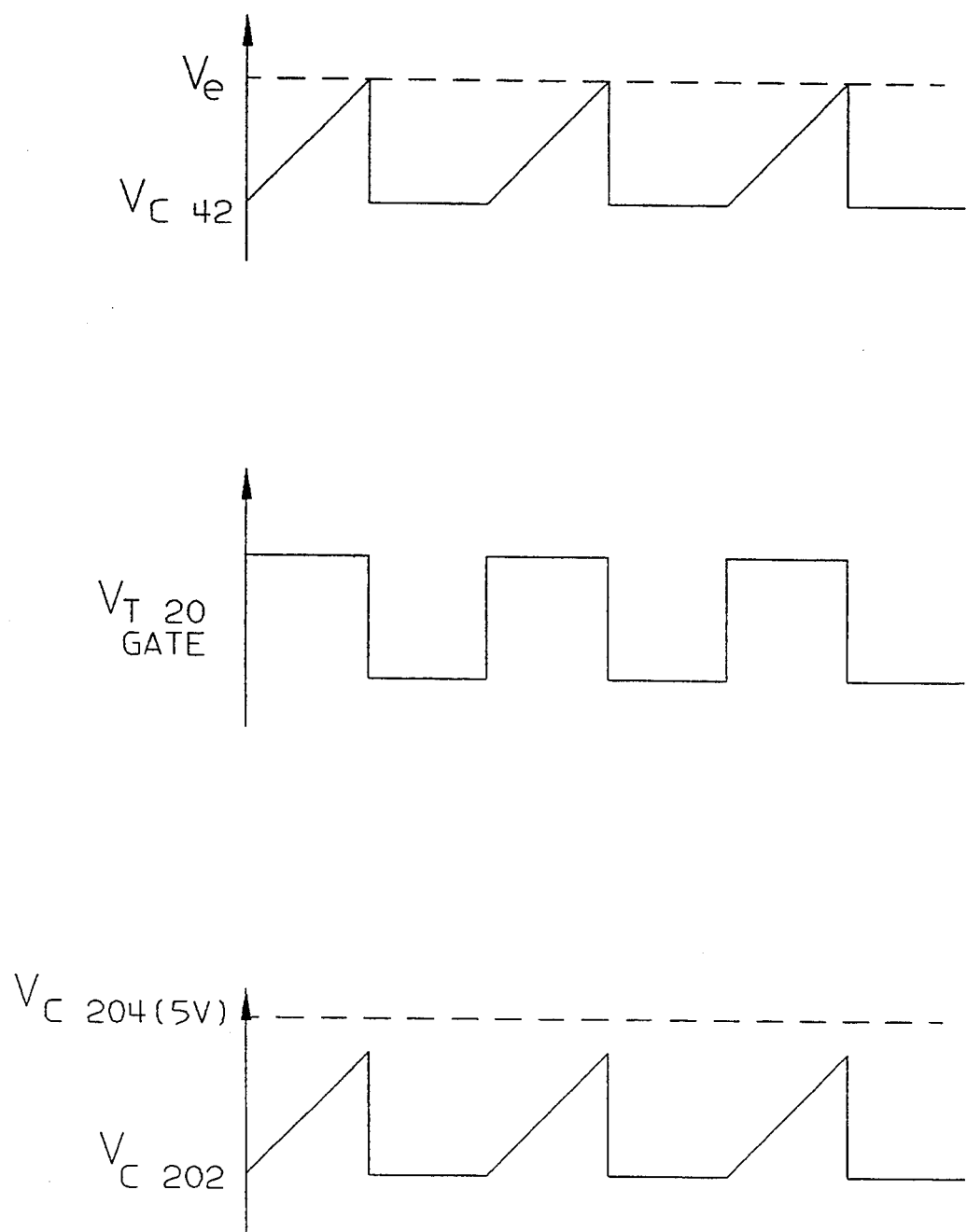
FIG. 2 is a graph of voltages developed across a rated voltage timing capacitor, an excess voltage timing capacitor and a gate of an overriding transistor within the circuit of FIG. 1 during rated input voltage conditions.

Because of the large size of output capacitor 22 and the large time constant, capacitor 22 retains substantially all of its charge when switch 20 is turned off for a short time (under normal load). Switch 20 remains turned off until the next cycle of clock 43. At that time, flip flop 221 is set again and turns on switch 20. This causes additional power to be delivered to transformers 111 and 11, and current to be delivered to the output capacitor 22 and timing capacitor 42. Because the DC output voltage, divided by resistors 27 and 29, is still less than the reference voltage, amplifier 30 outputs a positive DC voltage and delivers additional current to capacitor 32. The new current from amplifier 30 increases the error voltage. Capacitor 42 still charges much faster than capacitor 32 and the voltage of capacitor 42 soon exceeds the error voltage; however the time required is greater (but still safe for switch 20) during this cycle than during the first cycle because the error voltage is now higher. Thus, a greater amount of current is delivered to the output capacitor 22 during the second cycle than during the first. When the voltage across timing capacitor 42 exceeds the error voltage, the output of comparator 40 goes high and resets flip flop 221 which turns off switch 20. The foregoing process is repeated many times, with the amount of power delivered to the output capacitor 22 increasing each cycle. However, it should be noted that because of the short time constant of capacitor 42, the duty cycle of switch 20 is still short enough to prevent excess current flow in and heating of switch 20 during start up conditions. After some time, for example, a few seconds under rated conditions, the error voltage (across diode 33 and capacitor 32) reaches a steady state level and the on-time of switch 20 is approximately constant (assuming a steady load), as illustrated by the first and second timing graphs of FIG. 2. The steady state condition provides enough charging current for output capacitor 22 to satisfy a rated load, but not enough to overhead switch 20 or saturate power transformer 111. (FIG. 2 also illustrates charging of a capacitor 202. During the steady state conditions before a transient, capacitor 202 never reaches a respective reference level established by five volt power source 210 charging a capacitor 204 as described below and has no effect).

When power supply 10 is subjected to a large positive transient voltage spike on the input power supply line 16, the instantaneous power into power transformer 111 and current into switch 20 increase substantially. The charging rate of timing capacitor 42 from rectifier 21 also increases, but not proportionally to the increase in power and current in power transformer 111. Thus, absent the protection circuitry described below, the power transformer 111 and switch 20 may be damaged during the transient condition. Absent the protection circuitry described below, the power train transformer and switch may also be damaged after the voltage transient subsides, because at that time, the error voltage is excessive due to excess charging of capacitors 32 and 28 during the transient and the large time constant. With such excess error voltage, the timing capacitor will have to rise to a greater level in order to shut off the switch, and without the protection circuitry described below, the timing capacitor would then be charged at the normal rate. Consequently, without the protection circuit described below, the switch 20 would stay on for a much longer time than normal. This could overheat the switch and saturate the power transformer.

Consequently power supply 10 includes the following circuitry to protect against the immediate and post effects of lightening or other excess line voltage conditions. As noted above, in the illustrated example, the input power supply is formed by full wave rectification of an AC waveform to yield a rated DC voltage of 242 and rated peak voltage of 380 volts. If the peak input voltage is greater than the rated peak input voltage but not critical (for example 381-399 volts), then the following control takes effect. As noted above, the input power source charges capacitor 202 via a series resistor 200. The rising voltage across capacitor 202 is compared using a comparator 203 to five volts of capacitor 204. (Capacitor 204 was previously charged to the five volts from five volt power supply 210 via a large resistor 260.) The greater the input voltage the faster that the voltage across capacitor 202 reaches the five volt reference. When the voltage across capacitor 202 exceeds the five volt reference, comparator 203 activates a P channel transistor 206. Consequently, power supply 210 rapidly charges timing capacitor 42 via transistor 206 to rapidly reset flip flop 221 and shut off power transformer switch 20. This reduces on-time of switch 20 compared to what would result without the protection circuitry and ensures that switch 20 will not overheat and transformer 112 will not saturate during the 381-399 range of peak line voltage. The resetting of flip flop 221 also activates a transistor 225 to discharge capacitor 202 so limited power can still be delivered to the power transformer 112 during the next clock cycle. The magnitude of the input voltage affects the time required for the voltage across capacitor 202 to reach the fixed voltage across capacitor 204.

When the peak input voltage exceeds the threshold voltage of a zener diode 240 (400 volts in the foregoing example), two events occur to safeguard the power supply. First, current through zener diode 240 activates a transistor 290 which then reduces the error voltage (at the inverting input of comparator 40) to nearly zero volts. Thus, the timing capacitor 42 will more rapidly reach the voltage level necessary to shut off switch 20. Second, an N channel transistor 242 turns on and rapidly discharges capacitor 204 and shorts the noninverting input of comparator 203 to ground. Consequently, the voltage across capacitor 202 rapidly exceeds the reference voltage at the noninverting input and therefore, comparator 203 immediately activates P channel transistor 206. This rapidly charges timing capacitor 42 to shut off switch 20, even faster than the case where the peak input voltage was in the range 381-399 volts. This is advantageous because the condition is more dangerous with the higher voltage. Thus, switch 20 will exhibit a very short or even a substantially zero duty cycle until the peak input voltage drops below the threshold voltage of zener diode 240.

Figure 3:
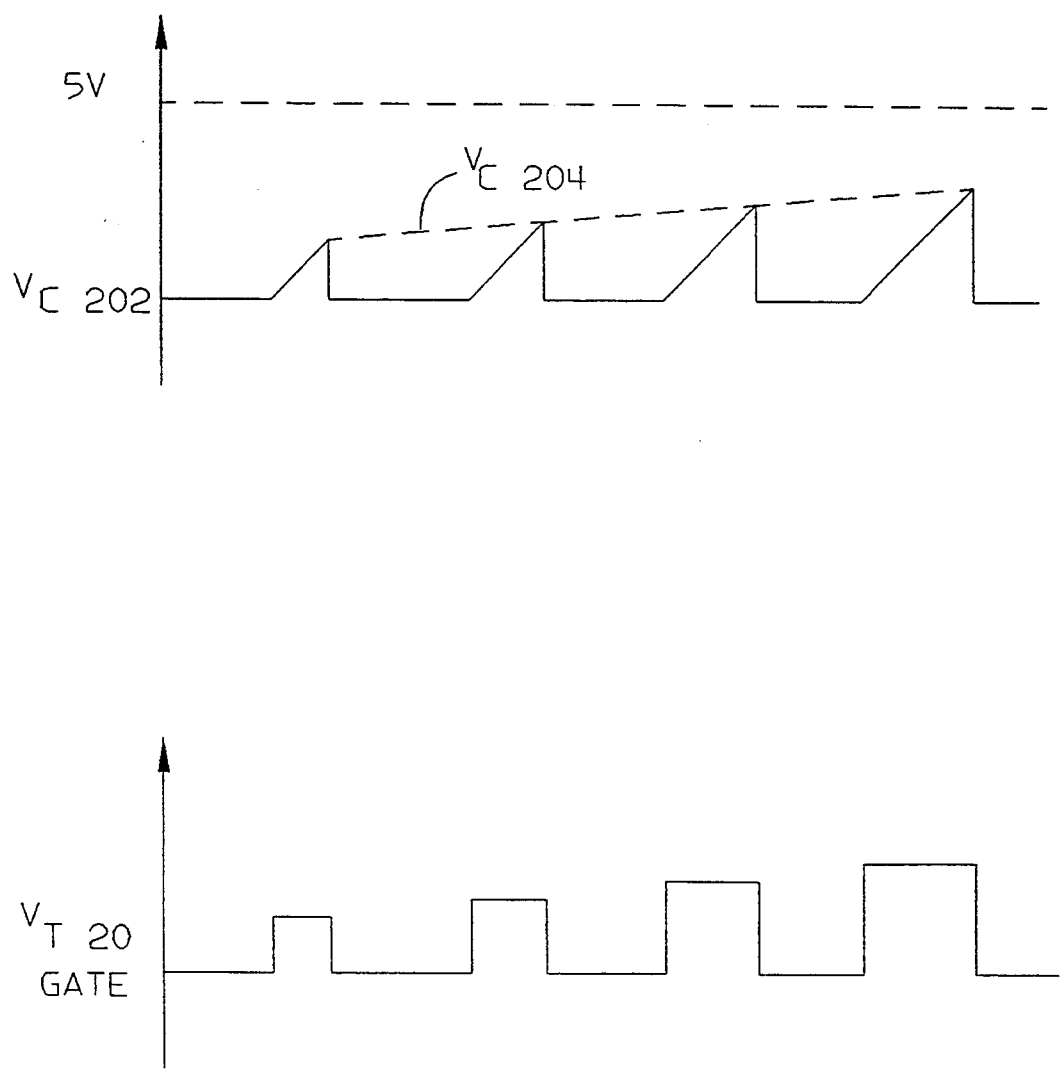
FIG. 3 is a graph of voltages developed across the excess voltage timing capacitor and switch within the circuit of FIG. 1 after a voltage transient subsides.

At that time, the error voltage will still be significantly higher than before the transient and will not quickly dissipate because of its large time constant. However, the on time of switch 20 is then determined by the charging of capacitor 202 and comparison to the voltage across capacitor 204. It should be noted that the voltage across capacitor 204 rises gradually via resistor 260 to the five volt level after the cessation of each surge (and the turn-off of transistor 242) as illustrated in FIG. 3. Thus, during the gradual rise of the capacitor 204 voltage, the on-time of switch 20 will rise gradually. By way of example, the RC time constant of resistor 260 and capacitor 204 is 100 microseconds. During the rise of the voltage of capacitor 204, the threshold for activating transistor 206 and shutting off switch 20 is much less than at the final five volt level. This reduces on-time of switch 20 and any risk of overheating of switch 20 and saturation of power transformer 111, even if there are multiple sequential lightning surges, one right after the other. Thus, the on-time of switch 20 will be safe even when the error voltage is excessive after the transient subsides. This satisfies another important object of the present invention.

Based on the foregoing, a pulse width modulated power supply according to the present invention has been disclosed. However, numerous modifications and substitutions can be made without deviating from the scope of the present invention. Therefore, the invention has been disclosed by way of illustration and not limitation and reference should be made to the following claims to determine the scope of the present invention.

I claim:

1. A pulse width modulated power supply comprising:
    a transformer having a primary winding, a secondary winding and means for coupling the primary winding to a power source;
    a switch connected in series with said primary winding to control power through the primary winding;
    a rectifier connected to the secondary winding to rectify current induced in the secondary winding;
    a first capacitor coupled to the rectifier to receive charging current therefrom;
    a second capacitor coupled to said power source to receive charging current therefrom; and
    means for controlling on time of said switch based on a comparison of a voltage across said first capacitor to a first reference voltage while said power source exhibits rated voltage, and a comparison of voltage of said second capacitor to a gradually rising second reference voltage after said power source exceeds a threshold voltage above said rated voltage and subsides to said threshold voltage.

2. A power supply as set forth in claim 1 wherein the controlling means comprises:
    first means for charging said first capacitor to said first reference voltage according to a first RC time constant while said power source exhibits rated voltage, said first reference voltage increasing when said power source exceeds said rated voltage and being in excess of a normal level after said power source exceeds a threshold voltage above said rated voltage and subsides to said threshold voltage; and
    second means, triggered by the second capacitor voltage reaching a third substantially constant reference voltage, for charging said first capacitor to said increased first reference voltage substantially faster than would said first means while said power source exceeds said rated voltage but is less than said threshold.

3. A power supply as set forth in claim 1 wherein the controlling means further comprises:
    first means for charging said first capacitor to said first reference voltage according to a first RC time constant while said power source exhibits rated voltage, said first reference voltage increasing when said power source exceeds said rated voltage and being in excess of a normal level after said power source exceeds a threshold voltage above said rated voltage and subsides to said threshold voltage; and second means, triggered by the second capacitor voltage reaching said second reference voltage, for charging said first capacitor to said, increased first reference voltage substantially faster than would said first means after said power source exceeds said threshold voltage and subsides to a level below said threshold voltage.

4. A power supply as set forth in claim 3 wherein the controlling means further comprises:

means for substantially inhibiting said switch as long as said power supply exceeds said threshold voltage.

5. A power supply as set forth in claim 1 wherein the controlling means further comprises:

means for substantially inhibiting said switch as long as said power supply exceeds said threshold voltage.

6. A power supply as set forth in claim 5 wherein said inhibiting means comprises means for substantially reducing said first reference voltage when said power source exceeds said threshold voltage.

7. A power supply as set forth in claim 5 wherein the inhibiting means comprises a transistor connected across a source of said first reference voltage, and a zener diode connected between said power source and a control of said transistor.

8. A power supply as set forth in claim 1 further comprising a second transformer in series with the first said transformer, a second rectifier coupled to a secondary winding of said second transformer, and an output capacitor coupled to said second rectifier to develop a DC output voltage.

9. A power supply as set forth in claim 8 further comprising a third capacitor and a differential amplifier coupled to receive a voltage based on said DC output voltage and a fixed reference voltage, and output current to said third capacitor to yield said first reference voltage.

10. A power supply as set forth in claim 1 wherein said controlling means comprises clock means for discharging said first capacitor after said switch is turned off and beginning charging of said first capacitor at the start of the next clock cycle during rated voltage and discharging said second capacitor after said switch is turned off and beginning charging of said second capacitor at the start of the next clock cycle when the voltage is greater than rated voltage but less than said threshold voltage.

11. A power supply as set forth in claim 1 wherein said switch comprises a transistor.

12. A power supply as set forth in claim 2 wherein the controlling means controls said duty cycle based in part on the voltage of said power source while said power source exceeds the rated voltage but is less than said threshold voltage.

13. A power supply as set forth in claim 1 wherein said controlling means further comprises a resistor connected between said second capacitor and said power source.

* * * * *